(12) United States Patent
Fay et al.

(10) Patent No.: US 10,160,191 B2
(45) Date of Patent: Dec. 25, 2018

(54) PAPER-SCRIM-FOIL CORE HAVING EXTRUDED POLYPROPYLENE RESIN

(71) Applicant: JOHNS MANVILLE, Denver, CO (US)

(72) Inventors: Ralph Michael Fay, Lakewood, CO (US); Anthony Edward Moore, Glen Allen, VA (US); Edward Albert Bright, Littleton, CO (US)

(73) Assignee: Johns Manville, Denver, CO (US)

( * ) Notice: Subject to any disclaimer, the term of this patent is extended or adjusted under 35 U.S.C. 154(b) by 814 days.

(21) Appl. No.: 14/620,454

(22) Filed: Feb. 12, 2015

(65) Prior Publication Data

US 2016/0236455 A1    Aug. 18, 2016

(51) Int. Cl.
*B32B 15/14*    (2006.01)
*B32B 29/02*    (2006.01)
(Continued)

(52) U.S. Cl.
CPC .......... *B32B 38/0008* (2013.01); *B29C 63/02* (2013.01); *B29C 63/06* (2013.01); *B32B 1/08* (2013.01); *B32B 3/02* (2013.01); *B32B 3/04* (2013.01); *B32B 3/06* (2013.01); *B32B 5/02* (2013.01); *B32B 5/028* (2013.01); *B32B 7/06* (2013.01); *B32B 7/12* (2013.01); *B32B 15/04* (2013.01); *B32B 15/14* (2013.01); *B32B 15/20* (2013.01); *B32B 27/10* (2013.01); *B32B 27/16* (2013.01); *B32B 27/18* (2013.01); *B32B 27/32* (2013.01); *B32B 29/002* (2013.01); *B32B 29/02* (2013.01); *B32B 37/153* (2013.01); *F16L 59/029* (2013.01); *F16L 59/08* (2013.01); *F16L 59/145* (2013.01); *B29C 2063/021* (2013.01);

(Continued)

(58) Field of Classification Search
CPC ... B29C 2063/021; B29C 63/02; B29C 63/06; B32B 15/04; B32B 15/14; B32B 15/20; B32B 1/08; B32B 2250/44; B32B 2255/12; B32B 2262/101; B32B 2307/304; B32B 2307/408; B32B 2307/412; B32B 2309/02; B32B 2311/00; B32B 2323/10; B32B 2597/00; B32B 27/10; B32B 27/16; B32B 27/18; B32B 27/32; B32B 29/002; B32B 29/02; B32B 37/153; B32B 38/0008; B32B 3/02; B32B 3/04; B32B 3/06; B32B 5/02; B32B 5/028; B32B 7/06; B32B 7/12; F16L 59/029; F16L 59/08; F16L 59/145
USPC ......................................................... 427/369
See application file for complete search history.

(56) References Cited

U.S. PATENT DOCUMENTS 3,862,869 A * 1/1975 Peterson .................. B32B 27/10
156/244.23
4,673,607 A * 6/1987 Hata ...................... B32B 37/153
428/172

(Continued)

*Primary Examiner* — Alexander M Weddle
(74) *Attorney, Agent, or Firm* — Robert D. Touslee

(57) ABSTRACT

Embodiments of the invention provide a facer used as protective covering for an insulation product. The facer may include a metallic foil layer, a scrim layer, and a paper layer positioned adjacent the scrim layer. The facer may also include a polypropylene material forming a polypropylene layer positioned adjacent the paper layer and heat bonded to an exposed major surface of the paper layer such that a portion of the polypropylene extends into pores of the paper layer to assist in coupling the polypropylene material to the paper layer.

9 Claims, 6 Drawing Sheets

(51) Int. Cl.
| | | |
|---|---|---|
| *F16L 59/08* | (2006.01) | |
| *B32B 38/00* | (2006.01) | |
| *B32B 5/02* | (2006.01) | |
| *F16L 59/02* | (2006.01) | |
| *F16L 59/14* | (2006.01) | |
| *B32B 7/06* | (2006.01) | |
| *B32B 7/12* | (2006.01) | |
| *B32B 15/04* | (2006.01) | |
| *B32B 15/20* | (2006.01) | |
| *B32B 27/10* | (2006.01) | |
| *B32B 27/18* | (2006.01) | |
| *B32B 27/32* | (2006.01) | |
| *B32B 29/00* | (2006.01) | |
| *B32B 1/08* | (2006.01) | |
| *B32B 3/02* | (2006.01) | |
| *B32B 3/06* | (2006.01) | |
| *B32B 27/16* | (2006.01) | |
| *B32B 3/04* | (2006.01) | |
| *B32B 37/15* | (2006.01) | |
| *B29C 63/02* | (2006.01) | |
| *B29C 63/06* | (2006.01) | |

(52) U.S. Cl.
CPC ....... *B32B 2250/44* (2013.01); *B32B 2255/12* (2013.01); *B32B 2262/101* (2013.01); *B32B 2307/304* (2013.01); *B32B 2307/408* (2013.01); *B32B 2307/412* (2013.01); *B32B 2309/02* (2013.01); *B32B 2311/00* (2013.01); *B32B 2323/10* (2013.01); *B32B 2597/00* (2013.01)

(56) References Cited

U.S. PATENT DOCUMENTS

| | | | |
|---|---|---|---|
| 2004/0146680 A1* | 7/2004 | Cohen | C09J 7/403 428/40.1 |
| 2005/0245651 A1* | 11/2005 | Cooper | C09J 123/08 524/270 |
| 2011/0111243 A1* | 5/2011 | Laiho | B32B 27/10 428/486 |

* cited by examiner

FIG. 3B
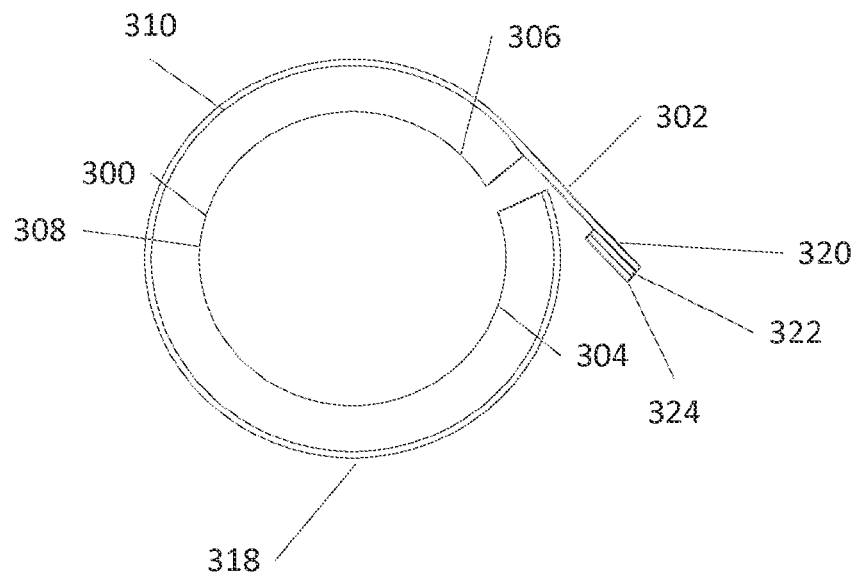
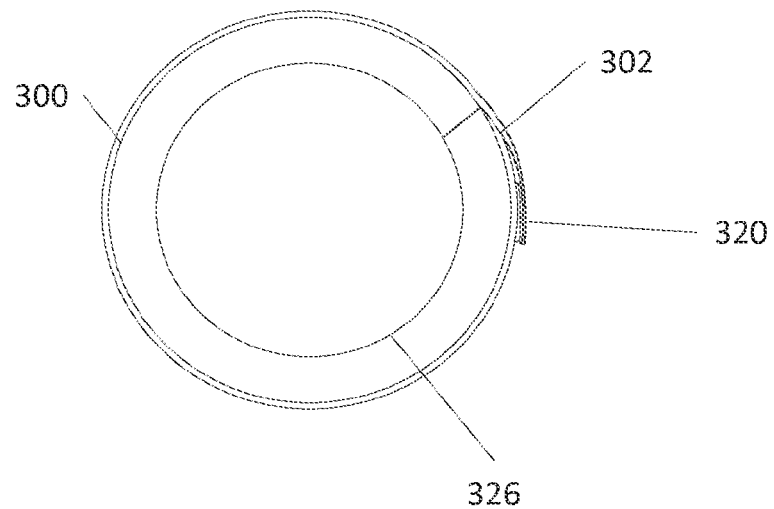
FIG. 3C

FIG. 5

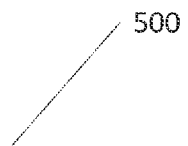

Providing a jacketing material comprising a metallic foil layer, a fiberglass reinforcing scrim layer, and a paper layer positioned adjacent the scrim layer — 502

Coating an exposed major surface of the paper layer of the jacketing material with a layer of melted polypropylene — 504

Applying pressure to the coated jacketing material using a cooled nip-roll assembly such that the layer of melted polypropylene solidifies into a polypropylene file to form a facer — 506

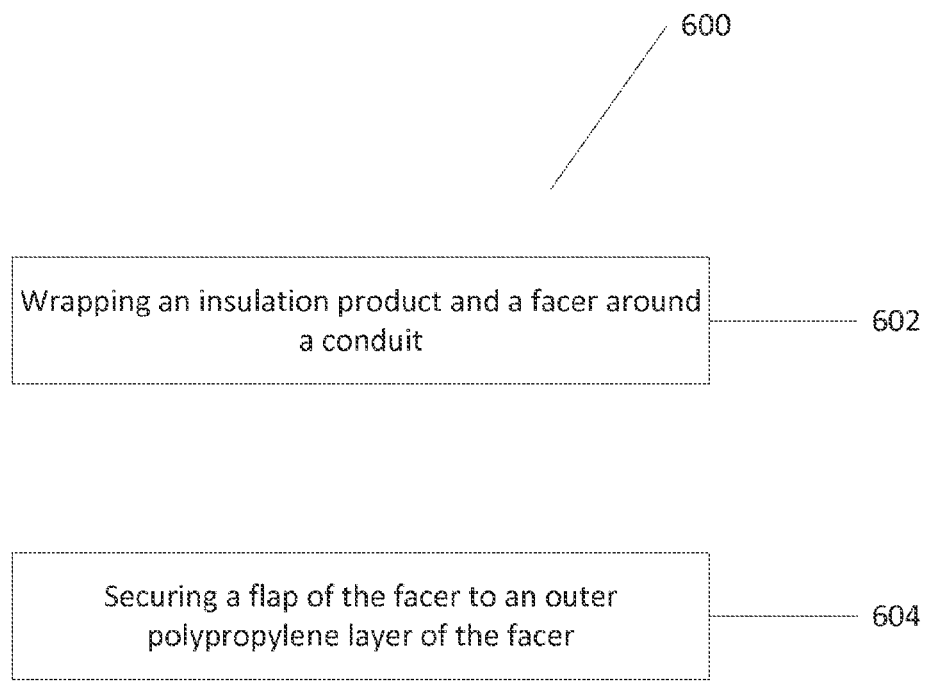

PAPER-SCRIM-FOIL CORE HAVING EXTRUDED POLYPROPYLENE RESIN

BACKGROUND OF THE INVENTION

Pipe insulation often includes a protective jacketing that may also provide aesthetic improvements to the insulation. The jacketing may increase the durability of the insulation, add vapor retarder and waterproofing effects, and/or provide other enhancements to the insulation material. Conventional jacketing often includes an outer layer of paper, such as kraft paper. Over time, the paper layer may yellow and/or it may absorb other materials, such as any liquids or gases that come into contact with the paper layer. The paper layer can be difficult to clean and the jacketing can dimple, leading the jacketing to lose some of the original aesthetic characteristics.

BRIEF SUMMARY OF THE INVENTION

Embodiments of the present invention provide facers for jacketing materials having an outer layer of polypropylene, as well as methods for manufacturing such facers. The polypropylene provides a surface that is easily cleanable and maintainable, and may protect inner layers from exposure to outside substances. The polypropylene may be extruded onto an outer layer of a jacketing material, such as an outer paper layer of a conventional jacketing material.

In one aspect, the present invention provides a facer used as protective covering for an insulation product. The facer may include a metallic foil layer, a scrim layer, and a paper layer positioned adjacent the scrim layer. The facer may also include a polypropylene material forming a polypropylene layer positioned adjacent the paper layer and heat bonded to an exposed major surface of the paper layer such that a portion of the polypropylene extends into pores of the paper layer to assist in coupling the polypropylene material to the paper layer.

In another aspect, a method of manufacturing a facer used as a protective covering for an insulation product is provided. The method may include providing a jacketing material. The jacketing material may include a metallic foil layer, a fiberglass reinforcing scrim layer, and a paper layer positioned adjacent the scrim layer. The method may also include coating an exposed major surface of the paper layer of the jacketing material with a layer of melted polypropylene. The method may further include applying pressure to the coated jacketing material using a cooled nip-roll assembly such that the layer of melted polypropylene solidifies into a polypropylene film to form the facer. A portion of the polypropylene film may extend into pores of the paper layer.

In another aspect, a method of applying a protective facer to an insulation product, the method is provided. The method may include wrapping an insulation product around a conduit. The insulation product may include a first end and a second end separated by a gap such that the insulation product is separable to receive the conduit through the gap. The method may also include wrapping a facer around the insulation product such that a flap extending from a first end of the facer overlaps a second end of the facer. The facer may include a metallic foil layer, a scrim layer, and a paper layer positioned adjacent the scrim layer. The facer may also include a polypropylene layer positioned adjacent the paper layer and heat bonded to an exposed major surface of the paper layer such that a portion of the polypropylene extends into pores of the paper layer to facilitate coupling of the polypropylene to the paper layer. The method may further include securing the flap to the polypropylene layer.

BRIEF DESCRIPTION OF THE DRAWINGS

FIGS. 3A-3C depict a pipe insulation material covered with a jacketing material having a polypropylene facer according to embodiments.

FIG. 5 is a flow chart illustrating a method for manufacturing a facer used as a protective covering for an insulation product according to embodiments.

FIG. 6 is a flow chart illustrating a method for applying a protective facer to an insulation product according to embodiments.

DETAILED DESCRIPTION OF THE INVENTION

Embodiments of the present invention provide durable facers having surfaces that remain relatively free of dimples and are easily cleaned. To provide an easily cleanable surface, a polypropylene film may be extruded on an outer layer of a jacketing material. For example, a conventional jacketing material, such as an all service jacket, may have a thin layer of polypropylene extruded onto the outer layer, such as a paper layer. The polypropylene film may also protect the paper layer from contact from outside substances and may prevent any staining or other discoloration of the paper layer. Such a polypropylene film may also provide a degree of waterproofing to the rest of the jacketing material and may provide enhanced protection against flame spread and smoke development. The facer may have a uniform color and surface to enhance the aesthetic appeal.

By extruding a layer of polypropylene, rather than laminating a premade polypropylene film, onto an outer layer of a jacketing material, significant cost savings are realized. There is no premade film to purchase and ship, and there is no adhesive necessary to bond the film to the jacketing material. The facers described herein may be at least substantially free of an adhesive between a polypropylene layer and a paper layer of the jacketing material. As described herein, substantially free of adhesive means that there is less than 5% adhesive. While discussed herein as being used to protect insulation materials used to insulate and protect pipes, it will be appreciated that other insulation applications, such as those using insulation boards, may benefit from the use of the facers described herein.

Figure 1:
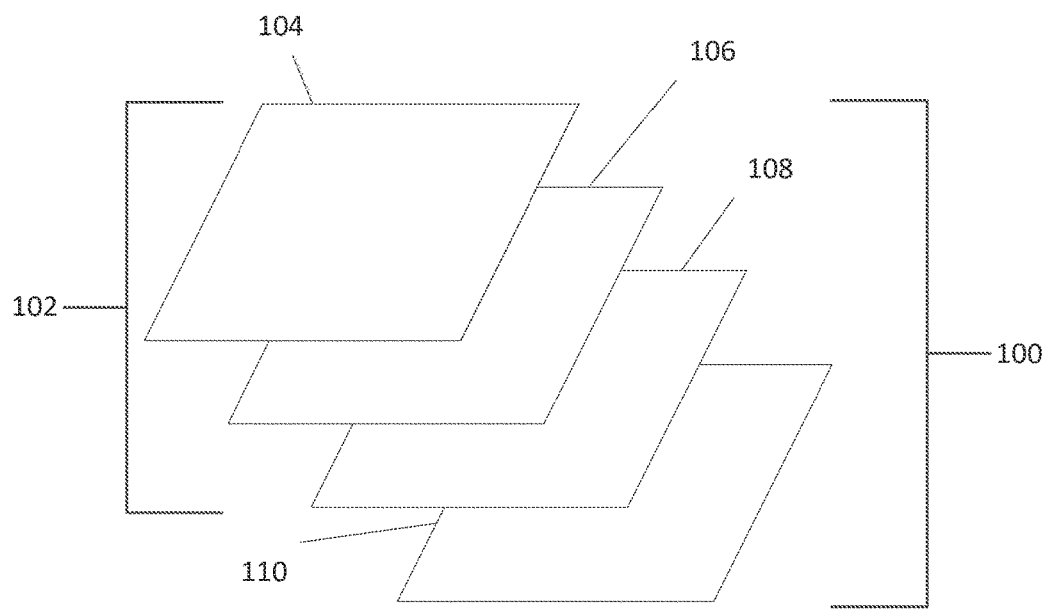
FIG. 1 depicts an exploded view of a jacketing material 100 according to embodiments.

Referring now to FIG. 1, an exploded view of facer 100 is shown. The facer 100 may include a jacketing material 102 having one or more layers that are laminated together under heat and pressure using fire retardant water based adhesive. For example, jacketing material 102 may include a metallic foil layer 104, a scrim layer 106 and/or a paper layer 108. In some embodiments, the metallic foil layer 104 may include aluminum foil or any other suitable metallic foil. In some embodiments, the metallic foil layer 104 may be between about 0.00025 and 0.00050 inches thick. The scrim layer 106 may be an electrical grade glass, such as a continuous fiber electrical grade glass (ECG) or an H size electrical grade glass having fiber diameter of 10 microns (ECH) For example, the glass may be ECH 75, 110 (11000 yards/tex), or 150 yarns that are between about 4×4 and 6×6 yards per inch spacing. In some embodiments, the paper layer 108 may include kraft paper, such as 38 or 44 lb kraft paper. The paper layer 108 may be bleached, white, brown, and/or any other suitable color to achieve desired aesthetic properties. The paper layer 108 may be between about 30 and 50 lbs/3 thousand square feet (msf), more likely 38 to 44 lbs/3 msf. Lighter weight papers may have less stiffness and memory which may result in the facer 100 being more pliable and conformable to use on an outer surface of cylindrical pipe insulation. While depicted herein as having three layers, it will be appreciated that any jacketing material made up of any number of layers of various materials may be used. In some embodiments, a polypropylene layer 110 may be extruded onto the outer, paper layer 108 of the jacketing material 102 to form the facer 100. A portion of the polypropylene film 110 may extend into pores of the paper layer 108 to assist in mechanical bonding and coupling the polypropylene film 110 to the paper layer 108.

In some embodiments, the polypropylene film 110 may be between about 0.0009 inches and 0.0017 inches thick, although other thicknesses may be used to suit the particular needs of an application. In some embodiments, the polypropylene film 110 may be at least partially transparent such that the paper layer 108 is visible through the polypropylene film 110. In other embodiments, the polypropylene film 110 may be opaque and be colored to meet particular needs of the application of the facer 100. In some embodiments, the polypropylene film 110 may have a smooth surface, or the surface may be textured. The surface finish may be imparted onto the polypropylene film 110 by a chill-nip roller during the manufacturing process. For example, a chill-nip roller may impart a matte finish on the polypropylene film 110 during the extrusion process.

In some embodiments, the polypropylene film may include one or more additives. The additives are often applied to the polypropylene prior to the polypropylene being melted and extruded onto the jacketing material 102. For example, the polypropylene may include one or more of a fire retardant, titanium dioxide, calcium carbonate, an ultra violet (UV) stabilizer, a heat stabilizer, antistatic agent, or a metal deactivator. Fire retardants may include brominated and/or non-brominated fire retardants. For example, Saytex BT-93, ethylene-bis-tetrabromophtalimide and/or $Sb_2O_3$ may be used. A resin adhesion promoter may be included in some embodiments. For example, maleic anhydride may be grafted onto the polypropylene, such as at a level of between about 6% and 9%. Maleic anhydride provides a site on the surface of the extruded polypropylene that OH groups may latch onto. Other adhesion promoter additives that provide similar surface sites may also be used. In some embodiments, less that about 2% of titanium dioxide and/or between about 6% and 11% calcium carbonate may be included in the polypropylene to adjust the color of the polypropylene, such as to increase whiteness to counteract any browning effect caused by use of a brominated fire retardant or as an extender to reduce cost. A UV stabilizer, such as pentaerythritol tetrakis(3-(3,5-di-tert-butyl-4-hydroxyphenyl)propionate) under the trade name Irganox 1010 may be added to meet UV resistance requirements. In some embodiments, a fire retardant may be present at between about 3-8 parts per 100 weight of polypropylene resin (phr). A UV stabilizer may be present at less than about 1 phr. Calcium carbonate may be present at less than about 15 phr. As one example, 100 pounds of the extruded polypropylene may include 93 pounds of polypropylene resin, 2 pounds of $TiO_2$, and 5 pounds of calcium carbonate. A UV stabilizer and/or a metal deactivator, such as MD1060 may be included. It will be appreciated that some facers will include other combinations and proportions of additives.

Figure 2:
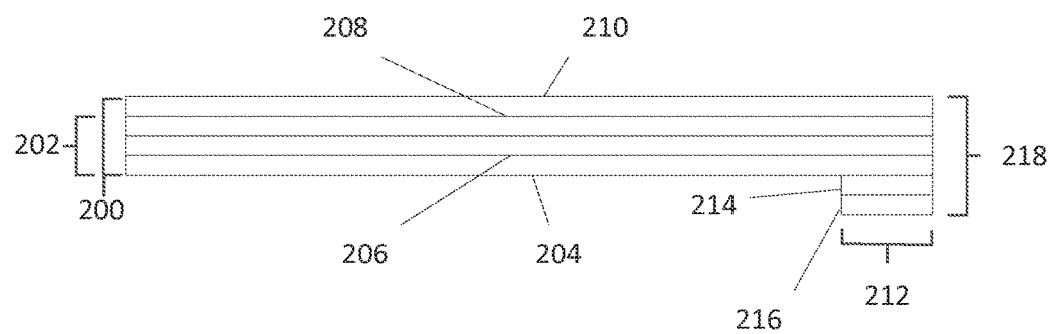
FIG. 2 shows a sheet of jacketing material having a lap seal according to embodiments.

FIG. 2 shows a sheet of a facer 200 having a lap seal or flap 212. In some embodiments, facer 200 can be a facer similar to facer 100 described above. For example, facer 200 may include a jacketing material 202 having a metallic foil layer 204, a scrim layer 206, and/or a paper layer 208. In some embodiments, the jacketing material 202 may have a different composition made up of one or more layers of various materials. The facer 200 may include a polypropylene film 210 that has been extruded on the outer layer of the jacketing material 202. The facer 200 may be cut to be longer than an insulation product to be wrapped around. A lap seal or flap 212 may be formed from all or part of a portion of the facer 200 configured to extend beyond the length of the insulation product. For example, the flap 212 may extend one or more inches beyond the length of the insulation product such that the flap may be secured to seal facer 200 around the insulation product. The flap 212 may include a pressure sensitive adhesive 214 on a bottom portion of the flap 212. A releasable liner 216 may be disposed on the pressure sensitive adhesive 214 such that when the releasable liner 216 is removed, the pressure sensitive adhesive 214 is exposed. The pressure sensitive adhesive 214 may be configured to be adhered to an outer surface of the polypropylene film 210 when the facer 200 is wrapped around an insulation material. The facer 200, pressure sensitive adhesive 214, and releasable liner 216 form a facer product 218 that is securable around an insulation product.

In some embodiments, the facer 200 having the polypropylene layer 210 may be treated with a corona treatment, a plasma treatment, and/or an enhanced plasma treatment. Such treatments involve blowing gases, such as air, past one or more electrodes to create positively charged ions that are deposited on the outer surface of the polypropylene film 210. This increases the surface energy of the polypropylene film 210 to make the surface more receptive to adhesives. In some embodiments, adequate adhesion is achieved when the surface energy of the polypropylene film 210 is at least 40 dyne/cm. In some embodiments, the gas used in a corona treatment is air, while in plasma treatments the gas may be a gas such as nitrogen, argon, oxygen, carbon dioxide, and the like. Plasma treatments may involve electrodes and deliver energy measured as watt density. Typical watt density treatment is at 3.0 to 5.0. In some embodiments, electrodes having a voltage input of 240V may be used in plasma treatments. Enhanced plasma treatments include using multiple gases, inert gases, and/or higher voltages. In some embodiments, a mixture of nitrogen and oxygen may be used, for example, a 90:10 blend may be used. Plasma and/or enhanced plasma treatments may provide a longer lasting surface energy treatment, and thus a longer lasting enhancement of adhesion ability of the polypropylene film 210 than a corona treatment. The corona, plasma, and/or enhanced plasma treatments may be done immediately after the polypropylene film 210 is extruded onto the jacketing material 202. The corona or plasma treatment may be done as a secondary process as a roll of facer 200 is rewound and/or trimmed, or may be done at the time of covering an insulation material at the manufacturing location of the insulation material.

When the jacketing material 202 is paper faced, the pressure sensitive adhesive 214 used to close the jacket flap 212 is typically bonding paper to aluminum foil, so the adhesive may be a standard adhesive. When the paper surface is covered with polypropylene the pressure sensitive adhesive 214 must be reformulated to provide acceptable adhesion to the difficult to bond to polypropylene surface. When the surface energy of the polypropylene is about 40-46 dyne/cm a more expensive, reformulated pressure sensitive adhesive 214 must be used to provide acceptable polypropylene to foil adhesion. In one embodiment, the polypropylene is treated with enhanced plasma raising the surface energy above 46 dyne/cm and as high as 70 dyne/cm. This enhanced plasma treated polypropylene surface is easier to bond to, so the same lower cost, paper to foil pressure sensitive adhesive 214 may be used to deliver acceptable polypropylene to foil adhesion. Enhanced bonding may be especially useful when applying the pressure sensitive adhesive in cold conditions or when the closed flap 212 is exposed to elevated temperatures.

Figure 3A:
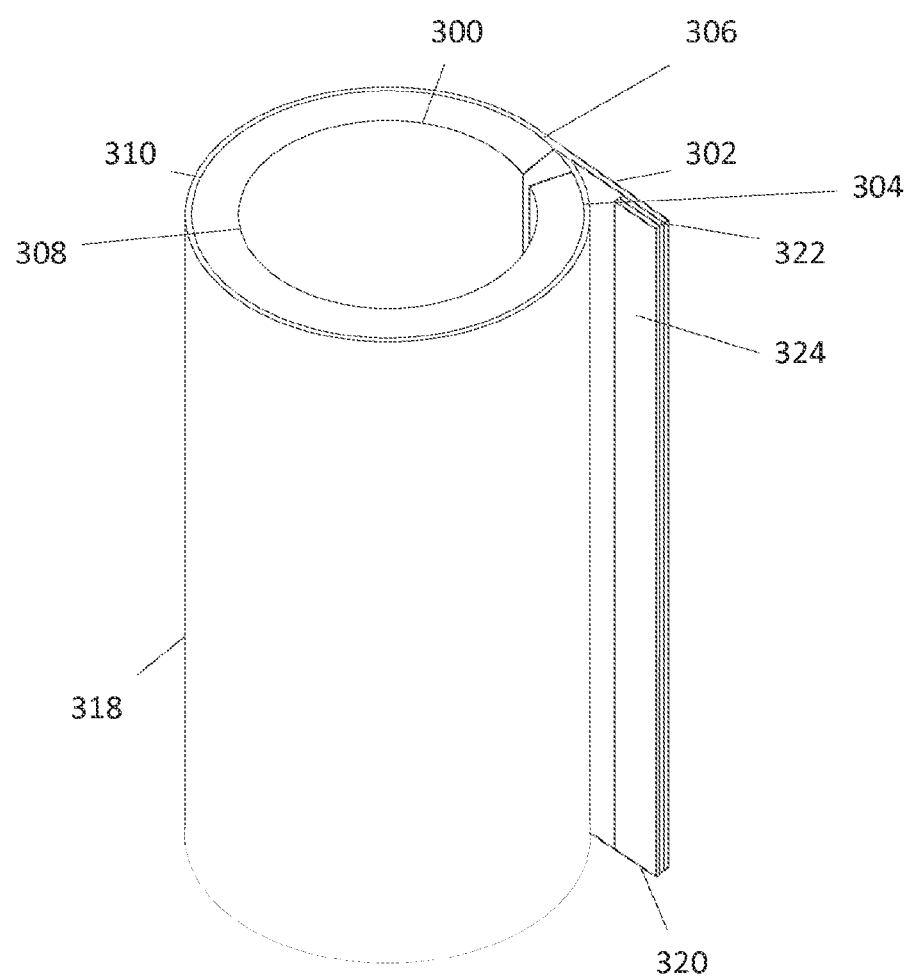

FIGS. 3A-3C depicts a pipe insulation material 300 covered with a facer 302. For example, FIG. 3A shows pipe insulation material 300 having a first end 304 and a second end 306. First end 304 and second end 306 are coupled with middle portion 308 to form a clamshell configuration as seen in the top view of FIG. 3B. The clamshell configuration enables the first end 304 and the second end 306 to be separable from one another to receive a pipe or conduit 326. The first end 304 and the second end 306 may then be positioned closer to one another to close the pipe insulation material 300 to partially or fully wrapped around pipe 326, as seen in FIG. 3C. In some embodiments, the first end 304 and the second end 306 may be in contact when wrapped around pipe 326. In other embodiments, there may be a gap between the first end 304 and the second end when pipe insulation material 300 is wrapped around pipe 326.

A facer 302 may be wrapped around an outer surface of the pipe insulation material 300. In some embodiments, the facer 302 may be positioned and/or secured on the pipe insulation material 300 prior to the pipe insulation material being wrapped around pipe 326. For example, the facer 302 may be adhered, bonded, or otherwise secured to the pipe insulation material 300 during the manufacturing process of the insulation material 300. Facer 302 may be facer 100 or 200 as described above. For example, facer 302 may include one or more layers. Facer 302 may include a jacketing material 310 having a metallic foil layer, a scrim layer, and/or a paper layer. In some embodiments, the jacketing material 310 may have a different composition made up of one or more layers of various materials. The facer 302 may include a polypropylene film 318 that has been extruded on the outer layer of the jacketing material 310. The facer 302 may be cut to be longer than insulation product 300. A lap seal or flap 320 may be formed from all or part of a portion of the facer 302 configured to extend beyond the length of the insulation product 300. The flap 320 may include a pressure sensitive adhesive 322 on a bottom portion of the flap 320. A releasable liner 324 may be disposed on the pressure sensitive adhesive 322 such that when the releasable liner 324 is removed, the pressure sensitive adhesive 322 is exposed. The pressure sensitive adhesive 322 may then be positioned over and placed in contact with an opposite end of the facer 302 such that the pressure sensitive adhesive 322 is adhered to an outer surface of an opposite side the polypropylene film 318 when the facer 302 is wrapped and closed around pipe insulation material 300. This serves to close and seal the pipe insulation material 300 and pipe 326 within facer 302. In some embodiments, the facer 302 having the polypropylene layer 318 may be treated with a corona treatment, a plasma treatment, and/or an enhanced plasma treatment to increase the surface energy and increase the receptivity to adhesion of the polypropylene film 318 to the pressure sensitive adhesive 322.

Figure 4:
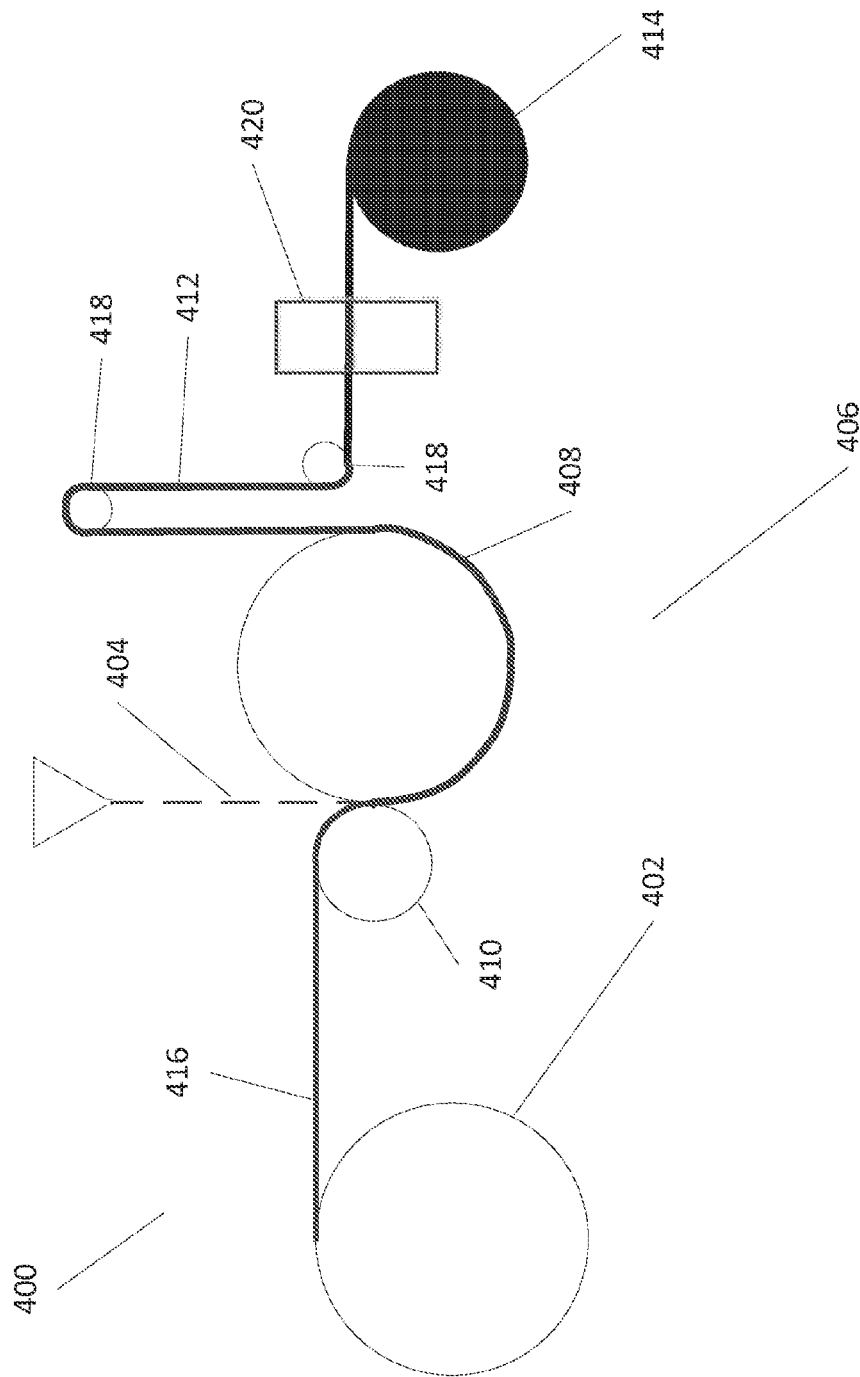
FIG. 4 depicts an assembly for producing an extruded layer of polypropylene on a jacketing material according to embodiments.

FIG. 4 depicts an assembly 400 for extruding polypropylene 404 on a jacketing material 402. The jacketing material 402 may be jacketing material 102, 202, and described above, or any other jacketing material having one or more layers of various materials. A sheet of jacketing material 416 may be fed into a nip roll assembly 406. In some embodiments, the sheet of jacketing material 416 may be fed into nip roll assembly 406 directly from an assembly used to manufacture the jacketing material 402. In other embodiments, as shown here, the jacketing material 402 may be manufactured in a separate assembly before a roll of jacketing material 402 is fed into assembly 400. The nip roll assembly 406 includes a chill-nip roller 408 and a backside pressure nip roller 410. Pellets of polypropylene may be fed into a hopper (not shown) and transported down a metal barrel of a screw extruder under heat and pressure. In some embodiments, the screw extruder may transport of polypropylene at a rate of between 10 and 15 rotations per minute (rpm). The pellets are melted and the melted polypropylene 404 is forced into a slot die extrusion apparatus. For example, the pellets may be heated above a melting point, and in some embodiments, near an upper temperature limit of polypropylene 404. For example, a temperature of between 450° F. and 575° F. may be used, more likely between about 500° and 550° F. However, other extrusion temperatures may be used. The extrusion temperature of the polypropylene resin depends on multiple factors such as, but not limited to, resin type and grade, additives that may impact melt temperature and viscosity, and line speed. The extrusion temperature may be selected such that the polypropylene resin flows, extrudes, and coats evenly at the desired thickness and bonds well to the paper substrate. By using an extrusion temperature near the upper limit for polypropylene, adhesion between the polypropylene 404 and the paper layer of the jacketing material 402 may be attained. The width and height of the opening of the slot die determine the width and thickness of a layer of melted polypropylene 404 to be applied to an outer surface of the jacketing material 402 before the jacketing material 402 enters the nip roll assembly 406. For example, the slot dies may be between about 10 and 86 inches wide and between about 0.015 inches and 0.035 inches high. In some embodiments, the slot die is positioned between about 2 inches and 3 inches above the nip roll assembly 406.

Within, the nip roll assembly 406, the backside pressure nip roller 410 presses the polypropylene 404 and jacketing material 402 against the chill-nip roller 408. In some embodiments, the compression pressure between the chill-nip roller 408 and the backside pressure roller may be up to about 4000 pounds per square inch (psi), although lower pressures such as between about 50 psi and 200 psi are possible. The chill-nip roller may be cooled to a temperature of between about 150° F. and 225° F. to help the polypropylene 404 cool and set as an extruded film onto the jacketing material 402 to form a facer 412. Thus, the polypropylene 404 is bonded with the jacketing material 402 using heat and pressure, rather than by using a separate adhesive as is done in other processes, such as lamination. In some embodiments, facer 412 may be facer 100, 200, or 302 as described herein. In some embodiments, the chill-nip roller 408 may be textured such that when the jacketing material 402 and polypropylene 404 are married between the chill-nip roller 408 and the backside pressure nip roller 410 the texture is imparted on the film of polypropylene 404. For example, the chill-nip roller 408 may have a non-glossy, matte surface that may impart a matte finish on the film of polypropylene 404. In other embodiments, the chill-nip roller 408 may be smooth or have other textures to control the surface finish on the extruded film of polypropylene 404. In one embodiment, a texture on a face of the chill-nip roller 408 is between about 0.004 inches and 0.006 inches minimum retained thickness of hard chromium with between about 20 and 30 roughness average (Ra) matte finish, although textures between about 15 Ra and 35 Ra may be commonly used.

In some embodiments, the backside pressure nip roller 410 may be covered in rubber. After the polypropylene 404 is extruded onto the jacketing material 402 to form facer 412, the facer 412 may be rolled up and/or cut into final lengths and/or widths to cover insulation products. In some embodiments, a plasma treatment unit 420 may be used to enhance the surface energy of the facer 412 as described herein. In some embodiments, a master roll of facer 414 may be trimmed such that the edges are cleanly cut and that the facer is sized to an appropriate width. The master roll 414 may be cut into flat sheets. The flat, cut facer may then have a pressure sensitive adhesive and a releasable liner affixed to a flap portion of the cut facer for securing the facer around an insulation material. The facer may be sized for specific insulation applications. Each flat sheet of facer may then be fed into a machine for making insulation material such that the facer may be adhered to the insulation material. In some embodiments, multiple small rollers 418 are used in roll goods manufacturing to change the direction sheet material being conveyed permitting less floor space. Small rollers 418 are also used to assist in aligning the sheet material as it moves down the line, to remove or minimize wrinkles space and to provide support for the sheet goods to traverse spans. It will be appreciated that other numbers and positions of rollers may be used to produce the facer 414. In some embodiments, the assembly line speed to produce facer 414 is as low as about 12 feet per minute or as high as about 1000 feet per minute, although slower or faster rates may be used.

FIG. 5 is a flow chart illustrating a method 500 for manufacturing a facer used as a protective covering for an insulation product. At block 502 a jacketing material may be provided. The jacketing material may be jacketing material 102, 202, 302, or 402 as described herein, or jacketing material may be any other jacketing material. In some embodiments, the jacketing material may include a metallic foil layer, a fiberglass reinforcing scrim layer, and a paper layer positioned adjacent the scrim layer. At block 504, the method may include coating an exposed major surface of the paper layer of the jacketing material with a layer of melted polypropylene such as by using the assembly 400 described above.

In some embodiments, one or more additives may be added to the polypropylene prior to melting the polypropylene and coating the paper layer. For example, maleic anhydride may be grafted onto polypropylene pellets prior to being melted to form the melted polypropylene. Other additives may be added such as one or more of a fire retardant, titanium dioxide, calcium carbonate, a UV stabilizer, a heat stabilizer, antistatic agent, or a metal deactivator as described herein. Pressure may be applied to the coated jacketing material using a cooled nip-roll assembly such that the layer of melted polypropylene solidifies into a polypropylene film to form the facer at block 506. The facer may be facer 100, 200, 302, or 412 as described herein. A portion of the polypropylene film may extend into pores of the paper layer. This may form mechanical and/or adhesive bonds between the polypropylene and the paper. In some embodiments, the nip-roll assembly may include a chill roller and a rubber-coated backside pressure roller. The chill roller may include a surface finish, such as a matte finish, that may be imparted on the coated facer. In some embodiments, the chill roller is between about 150° F. and 225° F. The temperature of the chill roller may depend on multiple factors such as, but not limited to, line speed, roller diameter, and extrusion temperature. In some embodiments, the polypropylene layer of the coated facer may be exposed to one or more of a corona treatment or a plasma treatment to increase the surface energy of the polypropylene. This increases the adherence between the polypropylene and adhesives.

In some embodiments, the coated facer may then be rolled for storage or delivery. The coated facer may also be cut to form facers of proper lengths and/or widths for particular applications. Oftentimes, the coated facers are cut to be longer than a corresponding insulation product to be covered. The extra facer material forms a flap that extends beyond the insulation product such that when the facer and insulation material are wrapped around a pipe or conduit, the flap may be used to secure a first end of the facer to a second, opposite end of the facer to seal the insulation material within the facer. The flap may include a releasable liner on an underside of the flap such that when the releasable liner is removed, a pressure sensitive adhesive is exposed that can adhere or otherwise secure the flap over the second end of the facer.

FIG. 6 is a flow chart illustrating a method 600 for applying a protective facer to an insulation product. In some embodiments, the facer may be facer 100, 200, 302, or 412 as described herein. An insulation product and a facer may be wrapped around a conduit at block 602. The insulation product may include a first end and a second end separated by a gap such that the insulation product is separable to receive the conduit through the gap. The facer wraps around the insulation product such that a flap extending from a first end of the facer overlaps a second end of the facer to cover the first end of the insulation product, the second end of the insulation product, and/or the gap. The facer may include a metallic foil layer, a scrim layer, a paper layer positioned adjacent the scrim layer, and a polypropylene layer positioned adjacent the paper layer and heat bonded to an exposed major surface of the paper layer such that a portion of the polypropylene extends into pores of the paper layer to facilitate coupling of the polypropylene to the paper layer. At block 604, the flap may be secured to the polypropylene layer. In some embodiments, the flap is secured to the polypropylene layer by removing a releasable liner to expose a pressure sensitive adhesive on an underside of the flap. The pressure sensitive adhesive may be positioned against a portion of the polypropylene layer such that the pressure sensitive adhesive bonds to the portion of the polypropylene layer. In some embodiments, pressure is applied by a squeegee or similar device to press the flap and pressure sensitive adhesive against an outer surface of the polypropylene layer to seal the facer around the insulation product.

In some embodiments, the facer and/or polypropylene include one or more additives, including a fire retardant, titanium dioxide, calcium carbonate, an ultra violet stabilizer, a heat stabilizer, antistatic agent, or a metal deactivator. The polypropylene layer may be transparent and may be between about 0.0009 inches and 0.0018 inches thick. When improved facer durability is desired the polypropylene layer may be much thicker; up to 0.010 inches thick, although this may not be economical for typical use as a jacket for pipe insulation. In some embodiments, the polypropylene layer has a matte finish that has been imparted by a matte-surfaced chill roller during the manufacturing process.

Embodiments of the invention have now been described in detail for the purposes of clarity and understanding. However, it will be appreciated that certain changes and modifications may be practiced within the scope of the appended claims.

What is claimed is:

1. A method of manufacturing a facer used as a protective covering for an insulation product, the method comprising:
   providing a jacketing material comprising:
      a metallic foil layer;
      a fiberglass reinforcing scrim layer; and
      a paper layer positioned adjacent the scrim layer, wherein the fiberglass reinforcing scrim layer is positioned between the metallic foil layer and the paper layer, wherein the paper layer has a primary face and a secondary face, and wherein the secondary face faces the fiberglass reinforcing scrim layer and the primary face faces away from the fiberglass reinforcing scrim layer;
   coating an exposed surface of a primary face of the paper layer of the jacketing material with a layer of melted polypropylene that forms an outermost layer of the facer;
   applying pressure to the coated jacketing material using a cooled nip-roll assembly such that the layer of melted polypropylene solidifies into a polypropylene film to form the facer, wherein a portion of the polypropylene film extends into pores of the paper layer, and wherein the polypropylene film forms a face that is exposed to the environment.

2. The method of manufacturing a facer used as a protective covering for an insulation product according to claim 1, further comprising:
   grafting maleic anhydride onto pellets formed from polypropylene prior to being melted to form the melted polypropylene.

3. The method of manufacturing a facer used as a protective covering for an insulation product according to claim 1, wherein:
   the nip-roll assembly comprises a chill roller and a rubber coated backside pressure roller.

4. The method of manufacturing a facer used as a protective covering for insulation products according to claim 3, wherein:
   the chill roller imparts a matte finish on the coated facer.

5. The method of manufacturing a facer used as a protective covering for an insulation product according to claim 3, wherein:
   the chill roller is between about 150° F. and 225° F.

6. The method of manufacturing a facer used as a protective covering for an insulation product according to claim 1, wherein:
   the facer comprises a flap having a releasable liner on an underside of the flap such that when the releasable liner is removed, a pressure sensitive adhesive is exposed; and
   the pressure sensitive adhesive is configured to adhere to the polypropylene film to secure the facer when the facer is wrapped around a conduit.

7. The method of manufacturing a facer used as a protective covering for an insulation product according to claim 6, further comprising:
   exposing the polypropylene to one or more of a corona treatment or a plasma treatment to increase the adherence between the polypropylene and the pressure sensitive adhesive.

8. The method of manufacturing a facer used as a protective covering for an insulation product according to claim 1, wherein:
   a surface energy of the exposed surface of the polypropylene layer is at least about 40 dyne/cm.

9. The method of manufacturing a facer used as a protective covering for an insulation product according to claim 1, wherein:
   a surface energy of the exposed surface of the polypropylene layer is between about 46 dyne/cm and 70 dyne/cm.

* * * * *